(12) United States Patent
Yang

(10) Patent No.: US 8,089,467 B2
(45) Date of Patent: Jan. 3, 2012

(54) KEYBOARD FRAME WITH INDUCTION LIGHT SOURCE

(75) Inventor: Chia-Yun Yang, Taoyuan County (TW)

(73) Assignee: Darfon Electronics Corp., Taoyuan (TW)

( * ) Notice: Subject to any disclaimer, the term of this patent is extended or adjusted under 35 U.S.C. 154(b) by 895 days.

(21) Appl. No.: 12/125,157

(22) Filed: May 22, 2008

(65) Prior Publication Data

US 2008/0291170 A1    Nov. 27, 2008

(30) Foreign Application Priority Data

May 24, 2007  (TW) ................................ 96208452 U

(51) Int. Cl.
*G06F 3/02* (2006.01)
(52) U.S. Cl. ........ 345/168; 345/169; 345/170; 345/171; 345/172; 361/679.08; 361/679.2
(58) Field of Classification Search .......... 345/168–172; 361/679.08–679.2

See application file for complete search history.

(56) References Cited

U.S. PATENT DOCUMENTS

2007/0035521 A1*   2/2007   Jui et al. ...................... 345/168
* cited by examiner

*Primary Examiner* — Richard Hjerpe
*Assistant Examiner* — Jeffrey Steinberg
(74) *Attorney, Agent, or Firm* — WPAT, PC; Justin King

(57) ABSTRACT

A keyboard frame with induction light source is disclosed, which comprises: a frame, a light guide plate, a signal line, a thermal sensor, a light source, a control circuit and a switch. As the light guide plate having the signal line disposed thereon is received in the frame while the thermal sensor and the light source is further disposed on the signal line and connected thereto, temperatures of a hand detected by the thermal sensor is transmitted to the control circuit where it is converted into electric signals and then send to the light source for directing the same to perform a color changing operation accordingly and thus cause the keyboard frame to display various coloring/lighting effects. With the aforesaid structure, not only the keyboard frame is fun to play for its ability to display various lighting/coloring effects, but also it is able to act as a thermometer for measuring human body's temperature. Moreover, the switch is used for controlling the on/off of the light source so that the keyboard frame can be personalized based on users preferences.

12 Claims, 5 Drawing Sheets

KEYBOARD FRAME WITH INDUCTION LIGHT SOURCE

FIELD OF THE INVENTION

The present invention relates to a keyboard frame with induction light source, and more particularly, to a keyboard frame capable of using a thermal sensor to detect temperature variations of a hand while using the detection to control the lighting and coloring of an LED light source as it is reflected by a light guide plate so that not only the keyboard frame is fun to play for its ability to display various lighting/coloring effects, but also it is able to act as a thermometer for measuring human body's temperature.

BACKGROUND OF THE INVENTION

With rapid advance of technology as well as the enhancement of our living quality, we are no longer satisfied with simply having an input apparatus with good inputting ability. It is desired to having an input apparatus capable of offering comfortable sense of touch, operating with dashing visual effects and other personalized abilities.

In most conventional keyboards, the keys fitted therein are usually available either in black or in white and are received in a black frame or a white frame. Even for meeting the personalized requirements of today's consumers, we can only find keyboards that are in pink, silver or other dull colors. That is, most keyboards currently available are designed with an idea for improving its practicality and functionality that their designs are functional-oriented and not market-oriented. However, for meeting the growing personalization requirements of today's consumers, it is in need to design a keyboard with a hint of amusement.

SUMMARY OF THE INVENTION

In view of the disadvantages of prior art, the object of the present invention is to provide a keyboard frame with induction light source capable of using a thermal sensor to detect temperature variations of a hand while using the detection to control the lighting and coloring of an LED light source as it is reflected by a light guide plate so that the keyboard frame is fun to play for its ability to display various lighting/coloring effects.

It is another object of the invention to provide a keyboard frame with induction light source capable of using a thermal sensor to detect temperature variations of a hand and thus acting as a thermometer for measuring human body's temperature.

To achieve the above objects, the present invention provides a keyboard frame with induction light source, comprising:
  a frame;
  a light guide plate, received in the frame;
  a signal line, being disposed on the light guide plate;
  a thermal sensor, being disposed on the signal line in a manner that it enables signals originated from the thermal sensor to be transmitted to a control circuit plate through the signal line as the signal line is connected to the thermal sensor and the control circuit plate;
  a light source, being disposed on the signal line in a manner that it enables signals originated from the control circuit plate to be transmitted to the light source through the signal line as the signal line is connected to the light source and the control circuit plate;
  a switch, being arranged at a side of the frame while connecting to the signal line for transmitting signals to the control circuit plate through the signal line and thus control the on/off of the light source; and
  the control circuit plate, for receiving and converting signals from the switch and the thermal sensor while transmitting the converted signals to the light source.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1:
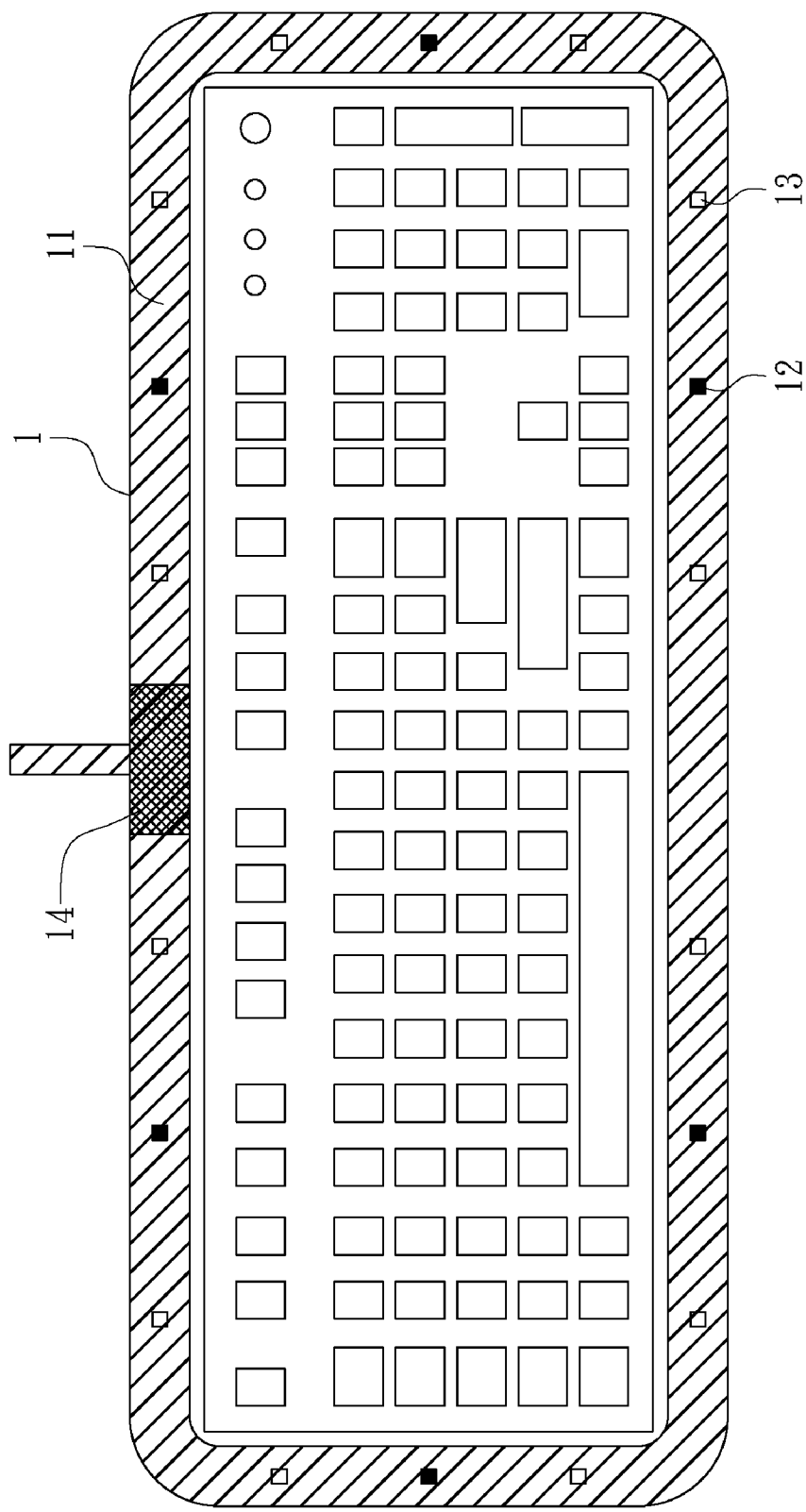
FIG. 1 is a sectional view of a keyboard frame with induction light source according to an exemplary embodiment of the invention.

Please refer to FIG. 1, which is a sectional view of a keyboard frame with induction light source according to an exemplary embodiment of the invention. In FIG. 1, the keyboard frame 1, being made of a transparent material, is configured with a light guide plate 11 in a manner that the light guide plate is circumferentially arranged following the inner edges of the frame 1 whereas the light guide plate 11 is a structure configured with light passages provided for light to reflect and travel therein. In addition, there is a thermal sensor and a light source being disposed on the light guide plate 11, in which the thermal sensor is further comprised of a plurality of sensing units 12 and the light source is further comprised of a plurality of lighting units 13 of high color differences, each being a light emitting diode (LED); and the plural sensing units 12 and the plural LEDs 13 are arranged in a manner that are arranged one after the other and spaced from each other by a specific distance. It is noted that the specific distance can be adjusted according to the color difference requirements. Thereby, when temperatures of a hand operating the keyboard is detected by the thermal sensor, the thermal sensor will generate signals corresponding to the detection and then transmit the signals to a control circuit plate 14 where it is converted into electric signals and then send to the light source for directing the same to perform a color changing operation accordingly and thus cause the keyboard frame 1 to display various coloring/lighting effects.

Figure 2:
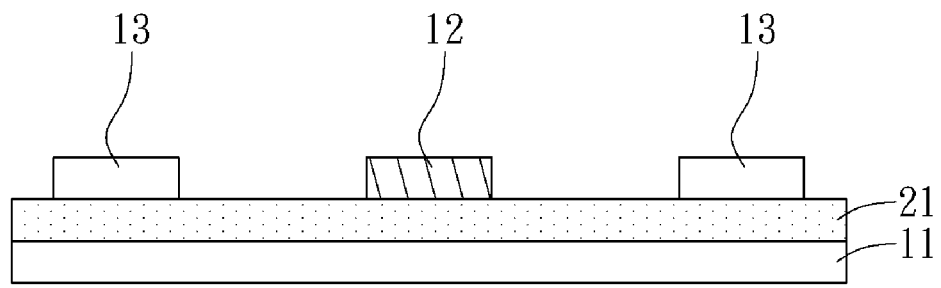
FIG. 2 is a front view of a keyboard frame with induction light source of the invention showing the disposition of its thermal sensor and light source in the keyboard frame.
Figure 3:
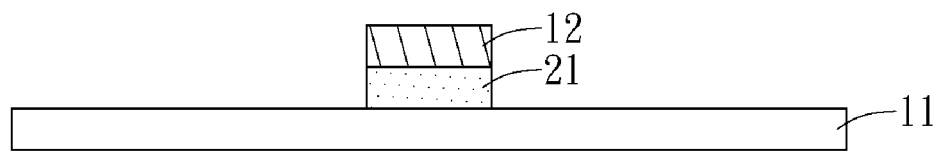
FIG. 3 are side views of a keyboard frame with induction light source of the invention showing respectively how the thermal sensor and the light source is disposed on the signal line.
Figure 3:
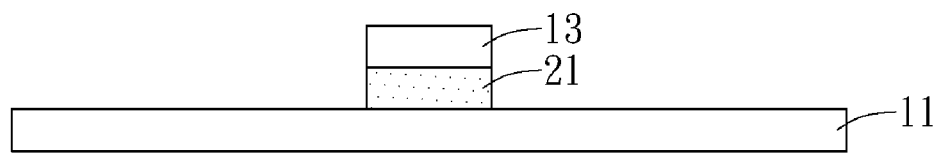

Please refer to FIG. 2 and FIG. 3, which is a front view of a keyboard frame with induction light source of the invention showing the disposition of its thermal sensor and light source in the keyboard frame and are side views of a keyboard frame with induction light source of the invention showing respectively how the thermal sensor and the light source is disposed on the signal line. As shown in FIG. 2, the plural sensing units 12 and the plural LED lighting units 13 are connected with each other by the signal line 21 in a manner that the sensing units 12 of the thermal sensor as well as the LED lighting units 13 of the light source are disposed on a signal line 21 while the signal line 21 is disposed on the light guide plate 11. Moreover, as the signal line 21 is further connected to the control circuit plate 14, temperature signal originated from the thermal sensor can be transmitted to the control circuit plate by the signal line 21. After receiving the temperature signals, the control circuit plate 14 will generate lighting signal in correspondence to the temperature signals and transmit the same to the LED lighting units 13 of the light source for directing those LED lighting units 13 to emit light of difference color depths accordingly.

Figure 4:
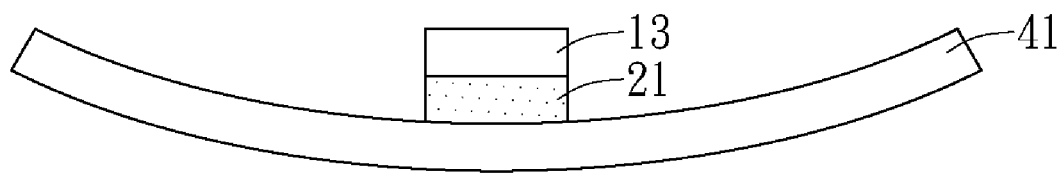
FIG. 4 shows an arc-shaped light guide plate of the invention.
Figure 5:
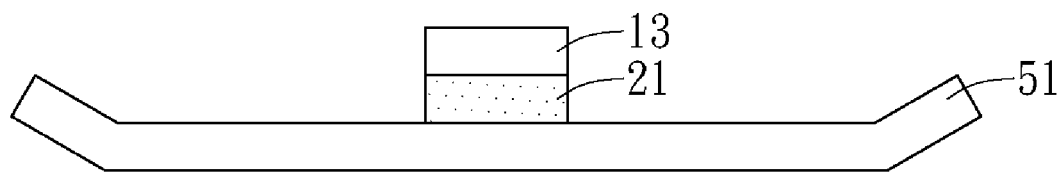
FIG. 5 shows a bevel-edged light guide plate of the invention.

Please refer to FIG. 4 and FIG. 5, which show two different light guide plates. For enabling light originated from the light source to be transmitted farther and generate more color depth variations and shadowing effects along the way, the light guide plate 14 can be designed as an arc-shaped structure 41, as shown in FIG. 4, or as structure having at least a bevel edge 51, as shown in FIG. 5.

Figure 6:
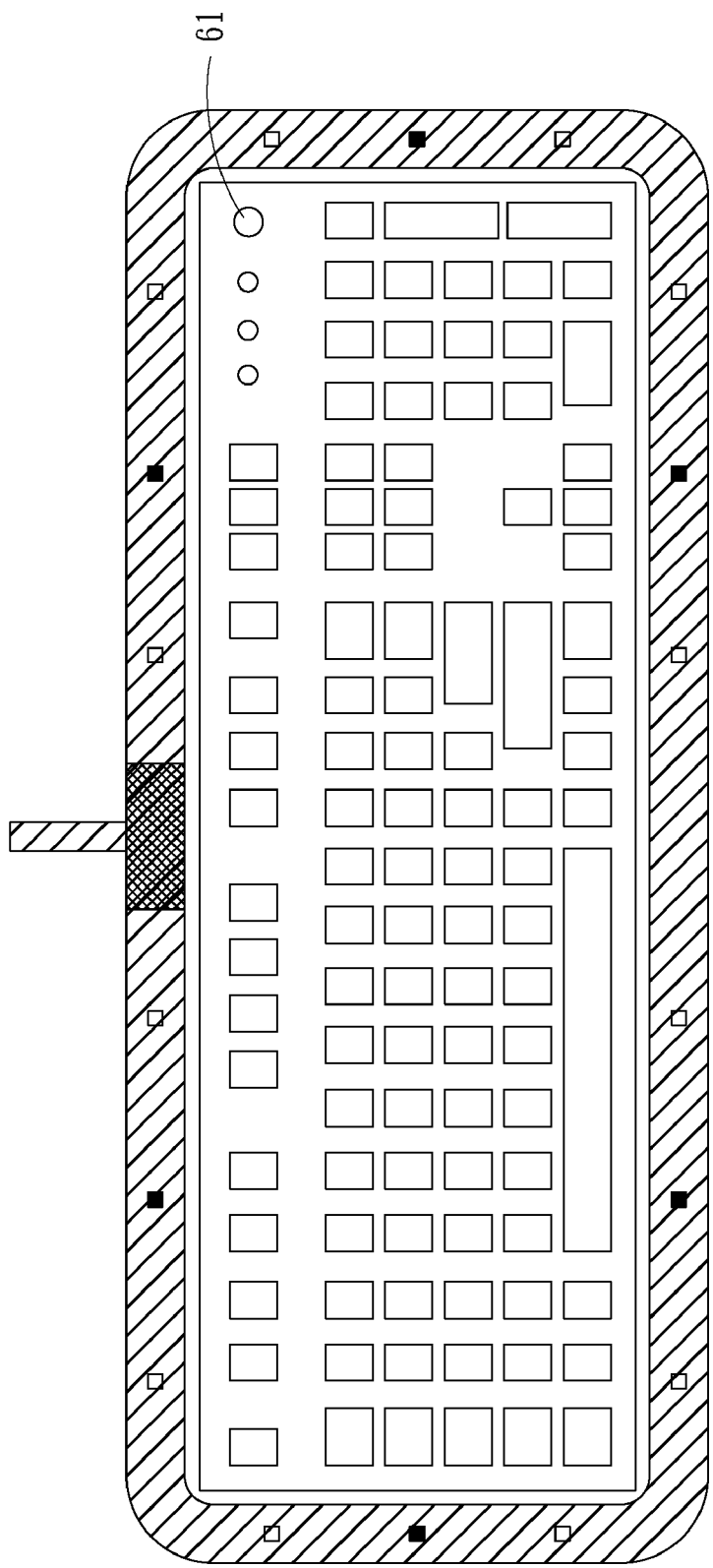
FIG. 6 is a schematic view of a keyboard frame with induction light source of the invention showing where a switch can be positioned.

Please refer to FIG. 6, which is a schematic view of a keyboard frame with induction light source of the invention showing where a switch can be positioned. In order to provide users with an option for determine whether he/she wants to operate the keyboard with the aforesaid coloring/lighting effects, a switch 61 is arranged in the keyboard frame which can be a button and is designed to issue an off signal to the control circuit plate 14 for turning the light source as the button 61 is pressed, and to issue an on signal to the control circuit plate 14 for turning on the light source as the button 61 is being pressed again.

Figure 7:
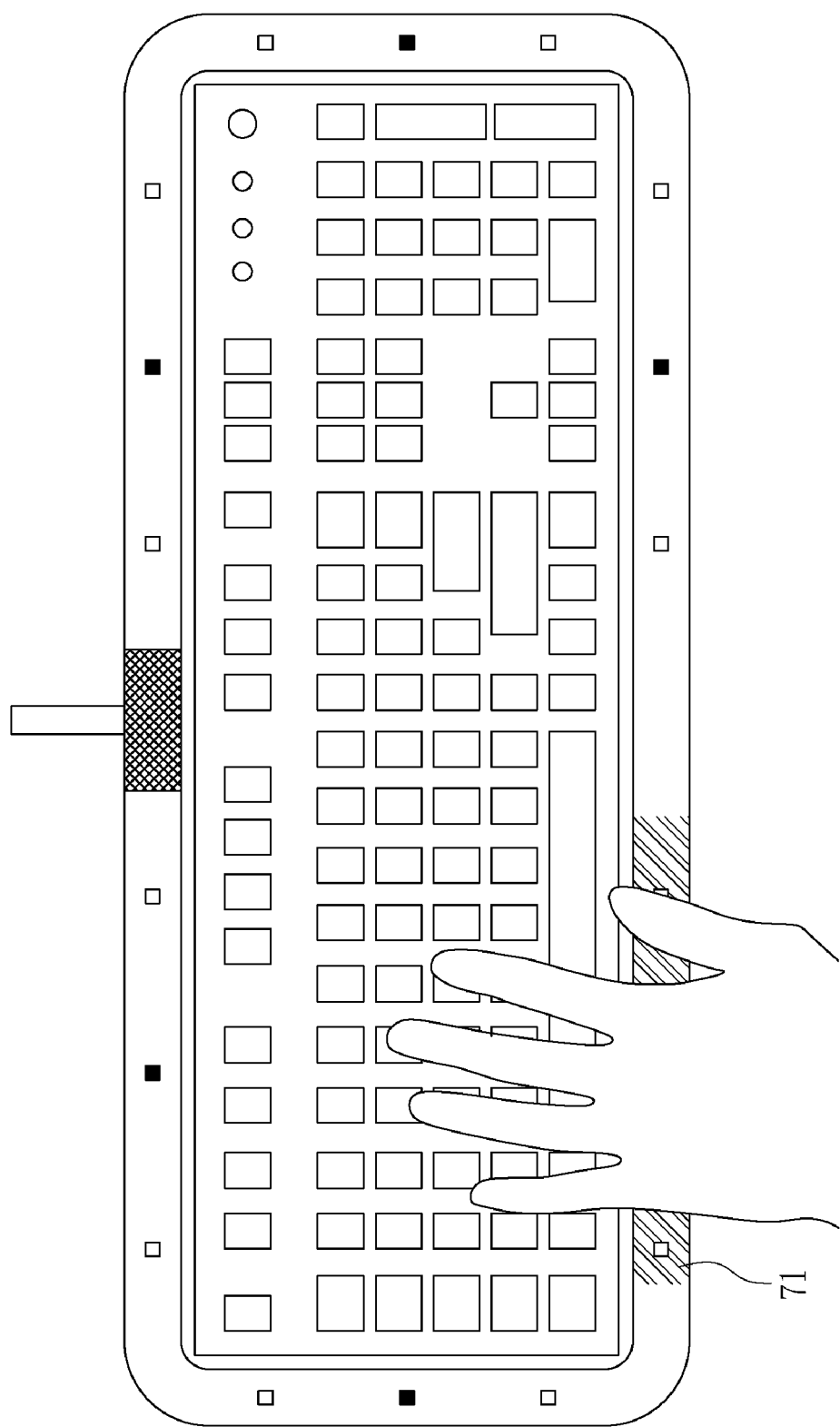
FIG. 7 is a schematic diagram depicting how the temperature of a hand can be detected and thus being used for enabling a keyboard frame with induction light source of the invention to display various lighting/coloring effects.

Please refer to FIG. 7, which is a schematic diagram depicting how the temperature of a hand can be detected and thus being used for enabling a keyboard frame with induction light source of the invention to display various lighting/coloring effects. As shown in FIG. 7, when a hand of a user enters the sensing range of any sensing units 12 of the thermal sensor, the thermal sensor will issue a temperature signal according to the temperature detected thereby to the control circuit plate 14 where it is converted into a lighting signal with respect to a color program embedded in the control circuit plate and then transmitted to the LED lighting units 13 of the light source which are in the neighborhood of the hand for directing those LED lighting units 13 to emit light of difference color depths accordingly and thus foaming a coloring area 71 with a visual effect designed by the color program.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A keyboard frame with induction light source, comprising:
   a frame;
   a light guide plate, received in the frame;
   a signal line, being disposed on the light guide plate;
   a thermal sensor, being disposed on the signal line in a manner that it enables signals originated from the thermal sensor to be transmitted to a control circuit plate through the signal line as the signal line is connected to the thermal sensor and the control circuit plate;
   a light source, being disposed on the signal line in a manner that it enables signals originated from the control circuit plate to be transmitted to the light source through the signal line as the signal line is connected to the light source and the control circuit plate; and
   the control circuit plate, for converting signals originated from the thermal sensor while transmitting the converted signals to the light source.

2. A keyboard frame with induction light source, comprising:
   a frame;
   a light guide plate, received in the frame;
   a signal line, being disposed on the light guide plate;
   a thermal sensor, being disposed on the signal line in a manner that it enables signals originated from the thermal sensor to be transmitted to a control circuit plate through the signal line as the signal line is connected to the thermal sensor and the control circuit plate;
   a light source, being disposed on the signal line in a manner that it enables signals originated from the control circuit plate to be transmitted to the light source through the signal line as the signal line is connected to the light source and the control circuit plate;
   the control circuit plate, for converting signals originated from the thermal sensor while transmitting the converted signals to the light source; and
   a switch, being arranged at a side of the frame while connecting to the signal line for transmitting signals to the control circuit plate through the signal line and thus control the on/off of the light source.

3. The keyboard frame with induction light source of claim 1, wherein the frame is made of a transparent material.

4. The keyboard frame with induction light source of claim 2, wherein the frame is made of a transparent material.

5. The keyboard frame with induction light source of claim 1, wherein the thermal sensor is further comprised of a plurality of sensing units and the light source is further comprised of a plurality of lighting units; and
   the plural sensing units and the plural lighting units are arranged in a manner that they are arranged one after the other and spaced from each other by a specific distance.

6. The keyboard frame with induction light source of claim 2, wherein the thermal sensor is further comprised of a plurality of sensing units and the light source is further comprised of a plurality of lighting units; and the plural sensing units and the plural lighting units are arranged in a manner that they are arranged one after the other and spaced from each other by a specific distance.

7. The keyboard frame with induction light source of claim 1, wherein the light source is a light emitting diode device.

8. The keyboard frame with induction light source of claim 2, wherein the light source is a light emitting diode device.

9. The keyboard frame with induction light source of claim 1, wherein the light guide plate is an arc-shape structure.

10. The keyboard frame with induction light source of claim 2, wherein the light guide plate is an arc-shape structure.

11. The keyboard frame with induction light source of claim 1, wherein the light guide plate is a structure having at least a bevel edge.

12. The keyboard frame with induction light source of claim 2, wherein the light guide plate is a structure having at least a bevel edge.

* * * * *